US009083648B2

(12) United States Patent
Chen (10) Patent No.: US 9,083,648 B2
(45) Date of Patent: Jul. 14, 2015

(54) METHOD AND SYSTEM FOR PERFORMING REMOTE NETWORK MANAGEMENT ON A VOICE HOME GATEWAY TERMINAL (75) Inventor: Yanheng Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 222 days.

(21) Appl. No.: 13/258,829

(22) PCT Filed: Jun. 2, 2010

(86) PCT No.: PCT/CN2010/073467
§ 371 (c)(1),
(2), (4) Date: Nov. 28, 2011

(87) PCT Pub. No.: WO2010/145453
PCT Pub. Date: Dec. 23, 2010

(65) Prior Publication Data
US 2012/0089717 A1 Apr. 12, 2012

(30) Foreign Application Priority Data
Jun. 19, 2009 (CN) .......................... 2009 1 0087381

(51) Int. Cl.
G06F 15/173 (2006.01)
H04L 12/24 (2006.01)
(Continued)

(52) U.S. Cl.
CPC .......... *H04L 41/5087* (2013.01); *H04L 41/082* (2013.01); *H04L 65/1036* (2013.01);
(Continued)

(58) Field of Classification Search
CPC .............. H04L 65/1003; H04L 65/102; H04L 65/1046; H04L 65/1016; H04L 65/1009; H04L 29/06027; H04L 29/06088
See application file for complete search history.

(56) References Cited

U.S. PATENT DOCUMENTS 7,103,644 B1 9/2006 Zhang
7,233,605 B1 * 6/2007 Oran ............................ 370/526
(Continued)

FOREIGN PATENT DOCUMENTS

CN 101217397 A 7/2008
CN 101582798 A 11/2009

OTHER PUBLICATIONS

International Search Report on international application No. PCT/CN2010/073467, mailed on Sep. 9, 2010.
(Continued)

Primary Examiner — Dhairya A Patel
(74) Attorney, Agent, or Firm — Oppedahl Patent Law Firm LLC (57) ABSTRACT This disclosure provides a method for performing remote network management on a voice home gateway terminal, and the method includes that: a remote network management server transmits voice signaling to the voice home gateway terminal; the voice home gateway terminal determines whether the voice signaling contains a non-voice triggering identifier, processes a voice service according to the voice signaling when no non-voice triggering identifier is contained, requests non-voice configuration information from the remote network management server when a non-voice triggering identifier is contained, and processes a non-voice service according to the received non-voice configuration information. This disclosure further provides a system for performing remote network management on a voice home gateway terminal. Application of the method and system enables the remote network management server to manage simultaneously a voice service and other non-voice services. The remote management performed on the voice home gateway terminal having a voice function is reliable, and this disclosure realizes the convergence for managing the integrated services of the voice home gateway terminal.

8 Claims, 2 Drawing Sheets (51) Int. Cl.
*H04M 3/22* (2006.01)
*H04M 7/00* (2006.01)
*H04L 29/06* (2006.01)

(52) U.S. Cl.
CPC ......... *H04L65/1073* (2013.01); *H04M 3/2209* (2013.01); *H04M 7/0069* (2013.01); *H04L 29/06027* (2013.01); *H04L 65/1046* (2013.01)

(56) References Cited

U.S. PATENT DOCUMENTS

| | | | |
|---|---|---|---|
| 2008/0081646 A1* | 4/2008 | Morin et al. | 455/466 |
| 2009/0181648 A1* | 7/2009 | Bao et al. | 455/414.1 |
| 2010/0029307 A1* | 2/2010 | Hacena et al. | 455/466 |
| 2011/0122827 A1* | 5/2011 | Bjorsell et al. | 370/328 |

OTHER PUBLICATIONS

English Translation of the Written Opinion of the International Search Authority in international application No. PCT/CN2010/073467, mailed on Sep. 9, 2010.

Supplementary European Search Report in European application No. 10788849.7, mailed on Feb. 11, 2015.

* cited by examiner

METHOD AND SYSTEM FOR PERFORMING REMOTE NETWORK MANAGEMENT ON A VOICE HOME GATEWAY TERMINAL

TECHNICAL FIELD

This disclosure relates to the field of a remote network management technology, in particular to a method and system for performing remote network management on a voice home gateway terminal.

BACKGROUND

When an existing remote network management server performs remote network management on a voice home gateway terminal, the management of voice services is generally performed according to a Session Initiation Protocol (SIP), H.323 protocol and Media Gateway Control Protocol (MGCP).

As a signaling control protocol in the application layer, the SIP is used for creating, modifying and releasing sessions of one or more participators. Soft switch utilizes SIP to manage voice services of the voice home gateway terminal, for example, phone ringing, call and on-hook, and so on; its specific implementation steps comprise: adding a voice processing module in the voice home gateway terminal to process messages such as an SIP Notify message; adding voice processing in the soft switch; the management of voice services is substantially completed through above two steps. The basic concept of soft switch is to separate a call control function from a media gateway in the transmission layer and implement the basic call control function through software, thereby implementing separation of call transmission from call control, so as to create separate planes for control, switch and software programmable functions. The management of a voice service may comprise phone ringing, call and on-hook and so on.

When a remote network management server performs remote network management on a voice home gateway terminal, the management of other services than the voice services is generally performed according to the Hypertext Transfer Protocol (HTTP), Secure Hypertext Transfer Protocol (HTTPS), and simple network management protocol (SNMP) and TR069 protocol. As other services except the voice service are relative to the voice service, other services than the voice service are relative to the voice service, which are shortly called non-voice services. Non-voice services may comprise version upgrade and parameter configuration and so on.

When an existing remote network management server performs remote network management on a voice home gateway terminal, it performs remote network management on either the voice service or the other services than the voice service, one excluding the other; if a same remote network management server cannot perform integrated management on various services of the voice home gateway terminal, it is mandatory to utilize different remote network management servers to manage the voice service and the non-voice services, respectively. For example, soft switch manages the voice service, while an Auto-Configuration Server (ACS) manages data services through the TR069 protocol. When a remote network management server manages the voice service, it cannot manage a non-voice service, which should be managed by another remote network management server. Consequently, for integrated services, it undoubtedly increases the overheads of the remote network management servers. Because it requires too many resources to develop network management servers, resources waste is caused.

SUMMARY

Therefore, a main objective of the present disclosure is to provide a method and system for performing remote network management on a voice home gateway terminal, so as to solve the problem that an existing remote network management server is unable to manage simultaneously a voice service and a non-voice service of the voice home gateway terminal.

In order to solve the technical problem, the technical solution of this disclosure is implemented as follows:

a method for performing remote network management on a voice home gateway terminal is provided, and the method comprises that:

transmitting, by a remote network management server, voice signaling to a voice home gateway terminal;

determining, by the voice home gateway terminal, whether the received voice signaling contains a non-voice triggering identifier, and processing a voice service according to the voice signaling when no non-voice triggering identifier is contained; requesting non-voice configuration information from the remote network management server when a non-voice triggering identifier is contained, and processing the non-voice service according to the received non-voice configuration information.

The method may further comprise: transmitting, by the voice home gateway terminal, a registration message to the remote network management server to establish a connection with the remote network management server before the remote network management server transmits the voice signaling to the voice home gateway terminal.

The voice home gateway terminal may comprise a voice processing module, a Network Management System (NMS) client and a non-voice processing module;

the voice processing module is configured to determine whether a non-voice triggering identifier is contained in the received voice signaling and further to process the voice service according to the voice signaling;

when no non-voice triggering identifier is contained in the voice signaling, the step of requesting non-voice configuration information from the remote network management server comprises: transmitting, by the voice processing module, a non-voice triggering message to the NMS client; and transmitting, by the NMS client, a non-voice request message to the remote network management server;

the non-voice processing module is configured to process the non-voice service according to the non-voice configuration information.

The remote network management server at least may comprise: an NMS server, the requesting non-voice configuration information from the remote network management server comprises: transmitting, by the voice home gateway terminal, a non-voice request message to the NMS server; and sending, by the NMS server, a non-voice response message to the voice home gateway terminal, the non-voice response message containing the non-voice configuration information.

The step of sending a non-voice response message to the voice home gateway terminal may comprise:

sending a corresponding non-voice response message to the voice home gateway terminal according to basic information contained in the non-voice request message; or, sending a pre-encapsulated non-voice response message to the voice home gateway terminal, and the non-voice response message meets a message format supported by the voice home gateway terminal.

A system for performing remote network management on a voice home gateway terminal is provided, comprising:

a remote network management server, configured to transmit voice signaling to a voice home gateway terminal, and configured to provide non-voice configuration information to the voice home gateway terminal according to a request from the voice home gateway terminal; and a voice home gateway terminal, configured to receive the voice signaling, determine whether the voice signaling contains a non-voice triggering identifier, process a voice service according to the voice signaling when no non-voice triggering identifier is contained, request non-voice configuration information from the remote network management server when a non-voice triggering identifier is contained, and process a non-voice service according to the received non-voice configuration information.

The voice home gateway terminal may be further configured to transmit a registration message to the remote network management server.

The remote network management server may comprise:

a voice message transmitting module configured to transmit the voice signaling to the voice home gateway terminal; and an NMS server, configured to receive a non-voice request message from the voice home gateway terminal and further to send a non-voice response message to the voice home gateway terminal.

The voice home gateway terminal may comprise:

a voice processing module, configured to receive the voice signaling from the remote network management server, determine whether the voice signaling contains a non-voice triggering identifier, process a voice service according to the voice signaling when no non-voice triggering identifier is contained, and transmit a non-voice triggering message to the NMS client when a non-voice triggering identifier is contained;

an NMS client, configured to transmit a non-voice request message to a remote network management server according to the non-voice triggering message, and instruct a non-voice processing module to process the non-voice service according to the non-voice configuration information contained in the non-voice response message that was transmitted from the remote network management server; and the non-voice processing module, configured to process the non-voice service according to the instruction from the NMS client.

The NMS client may be further configured to send a non-voice triggering response message to the voice processing module.

In the solutions of the present disclosure, a remote network management server transmits voice signaling to a voice home gateway terminal; the voice home gateway terminal determines whether the voice signaling contains a non-voice triggering identifier, processes a voice service according to the voice signaling when no non-voice triggering identifier is contained, requests non-voice configuration information from the remote network management server when a non-voice triggering identifier is contained, and processes a non-voice service according to the received non-voice configuration information. In this way, the remote network management server can manage simultaneously a voice service and a non-voice service. A voice home gateway terminal with voice functionalities can be reliably remotely managed, thereby realizing the convergence for managing integrated services of the voice home gateway terminal; with only few resources needed to develop a remote network management server, effective management of the integrated services of the voice home gateway terminal can be achieved by the remote network management server, thereby reducing the consumption of the resources for managing various services of the voice home gateway terminal comparing with they are managed by different remote network management servers.

The beneficial effects of the solution of this disclosure are further embodied in the following aspects:

1. Comparing with the case that the voice service and the non-voice service are managed respectively by different remote network management servers, this disclosure can reduce the processing of managing a voice service and a non-voice service of the voice home gateway terminal, minor impact on the voice home gateway terminal, and decrease the required resources overhead.

2. The aforementioned voice signaling can be implemented according to SIP. when the voice signaling contains a non-voice triggering identifier, the interaction between the voice home gateway terminal and the remote network management server can be according to HTTP or HTTPS, such that SIP is combined with HTTP or HTTPS to give their respective functions of the two protocols; if the voice home gateway terminal itself comprises a voice processing module or an HTTP processing module, the solution of this disclosure can be implemented by simply modifying the original processing approach to the voice home gateway terminal.

3. This disclosure can be widely applied to the integrated services and its service is friendly; with many management manners added, the service providers are facilitated to provide more convenient services, for example, upgrading for the voice home gateway terminal can be implemented just through simple interaction, while the traditional approach requires multiple times of the configuration or operation.

DETAILED DESCRIPTION

The overall concept of this disclosure is that: a remote network management server transmits voice signaling to a voice home gateway terminal; the voice home gateway terminal determines whether the voice signaling contains a non-voice triggering identifier, processes a voice service according to the voice signaling when no non-voice triggering identifier is contained, requests non-voice configuration information from the remote network management server when a non-voice triggering identifier is contained, and processes a non-voice service according to a piece of received non-voice configuration information. The non-voice service refers to other services than a voice service. That is, information related to the management of the non-voice services may comprise a file name, a file version, an upgrade server name, a server version and a protocol manner, and so on.

Figure 1:
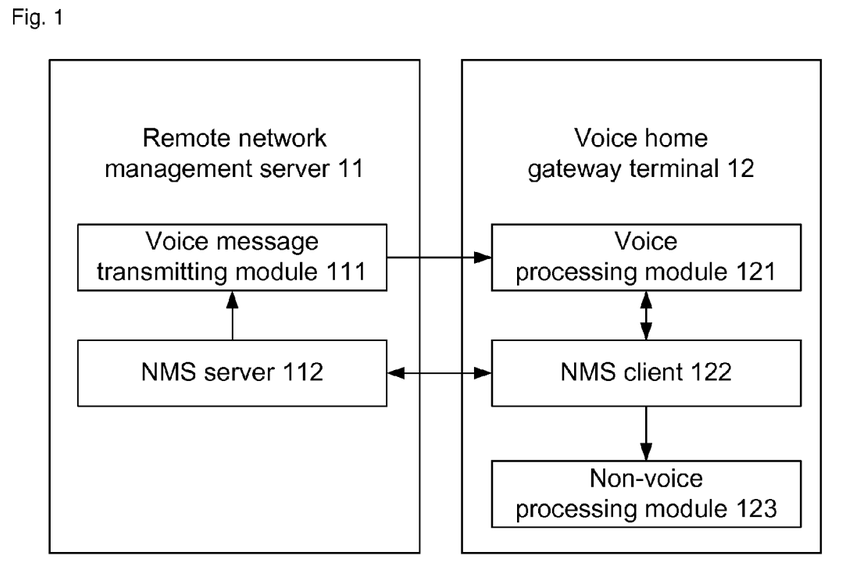
FIG. 1 illustrates a compositional diagram of a system for performing remote network management on a voice home gateway terminal in this disclosure.

FIG. 1 illustrates a system for performing remote network management on a voice home gateway terminal, the system comprises that: a remote network management server 11 and a voice home gateway terminal 12, wherein the remote network management server 11 is configured to transmit voice signaling to the voice home gateway terminal 12; and further configured to provide non-voice configuration information to the voice home gateway terminal 12 according to a request from the voice home gateway terminal 12;

the voice home gateway terminal 12 is configured to receive the voice signaling, determine whether the voice signaling contains a non-voice triggering identifier, process a voice service according to the voice signaling when no non-voice triggering identifier is contained, request non-voice configuration information from the remote network management server 11 when a non-voice triggering identifier is contained, and process a non-voice service according to the received non-voice configuration information.

The voice home gateway terminal 12 is further configured to transmit a registration message to the remote network management server 11, so as to establish a connection with the remote network management server 11.

When it is needed to manage the non-voice service of the voice home gateway terminal 12, the voice signaling from the remote network management server 11 contains a non-voice triggering identifier; when it is not needed to manage the non-voice service of the voice home gateway terminal 12, the voice signaling from the remote network management server 11 does not contain the non-voice triggering identifier, for the voice home gateway terminal 12 to perform processing of the voice service.

In this embodiment, the remote network management server 11 comprises: a voice message transmitting module 111 and a Network Management System (NMS) server 112;

the voice message transmitting module 111 is configured to transmit voice signaling to the voice home gateway terminal 12; when it is needed to manage the non-voice service of the voice home gateway terminal 12, the voice signaling contains a non-voice triggering identifier. For example, the voice message transmitting module 111 encapsulates the voice signaling in the SIP Notify message format, wherein the message header contains information having a content "Event: resync". This information is a non-voice triggering identifier acting as the identifier for triggering the non-voice service management by the remote network management server 11 and the voice home gateway terminal 12;

the NMS server 112 is configured to receive the non-voice request message from the voice home gateway terminal 12, and send a non-voice response message back to the voice home gateway terminal 12, the non-voice response message containing non-voce configuration information. The non-voice request may contain basic information of the voice home gateway terminal 12, the basic information being some basic parameters of the voice home gateway terminal 12, such as file name, version information, upgrade server and protocol way.

The NMS server 112 may send a non-voice response message back to the voice home gateway terminal 12 according to the basic information contained in the non-voice request message, and may also send the non-voice response message that is encapsulated in advance to the voice home gateway terminal 12.

The remote network management server 11 and the NMS server 112 may determine the management to be performed on the non-voice service according to the basic information of the voice home gateway terminal 12. For example, when the NMS server 112 determines through comparison that the version information in the basic information is inconsistent with the version information stored locally, upgrade operation is needed on the voice home gateway terminal 12. Therefore, the non-voice configuration information contained in the non-voice response message may be the file of the current version.

Additionally, during remote management of the voice home gateway terminal 12, because the remote network management server 11 acts as a manager, the management of the non-voice service to be performed for the voice home gateway terminal 12 is always determined by the remote network management server 11. Therefore, after determining to manage the non-voice service of the voice home gateway terminal 12, the remote network management server 11 may perform encapsulation in advance according to the support condition of the message format by the voice home gateway terminal 12. For example, the message format employs the Extensible Markup Language (XML), and the message content employs a set of configuration parameters. In this way, after receiving the non-voice request message, the remote network management server 11 may directly return a non-voice response message that is pre-encapsulated to the voice home gateway terminal 12, thereby improving the processing efficiency.

The NMS server 112 is further configured to receive the registration message from the voice home gateway terminal 12, and notify the voice message transmitting module 111 that it has received the registration message from the voice home gateway terminal 12. The voice message transmitting module 111 sends the voice signaling only after receiving the notice from the NMS server 112.

In this embodiment, the voice home gateway terminal 12 comprises a voice processing module 121, an NMS client 122 and a non-voice processing module 123, wherein the voice processing module 121 is configured to receive the voice signaling from the remote network management server 11, determine whether the received voice signaling contains a non-voice triggering identifier, process a voice service according to the voice signaling when no non-voice triggering identifier is contained; and transmit a non-voice triggering message to the NMS client 122 when a non-voice triggering identifier is contained;

the NMS client 122 is configured to transmit a non-voice request message to the remote network management server 11 according to the non-voice triggering message from the voice processing module 121. The non-voice request message may further contain the basic information of the voice home gateway terminal 12 and instruct the non-voice processing module 123 to process the non-voice service according to the non-voice configuration information contained in the non-voice response message that was sent from the remote network management server 11;

the non-voice processing module 123 is configured to process the non-voice service according to the instruction from the NMS client 122.

Additionally, the NMS client 122 is further configured to transmit a registration message to the remote network management server 11. The NMS client 122 may be further configured to send a non-voice triggering response message to the voice processing module 121.

From above description, it can be seen that the message interaction between the remote network management server 11 and the voice home gateway terminal 12 is specifically implemented by the voice message transmitting module 111 and the voice processing module 121, as well as by the NMS server 112 and the NMS client 122. A message interacted between the voice message transmitting module 111 and the voice processing module 121 may be an SIP message; a message interacted between the NMS server 112 and the NMS client 122 may be an HTTP message. At this point, the NMS server 112 plays the role of an HTTPS server, while the NMS client 122 plays a role of an HTTPS client.

Figure 2:
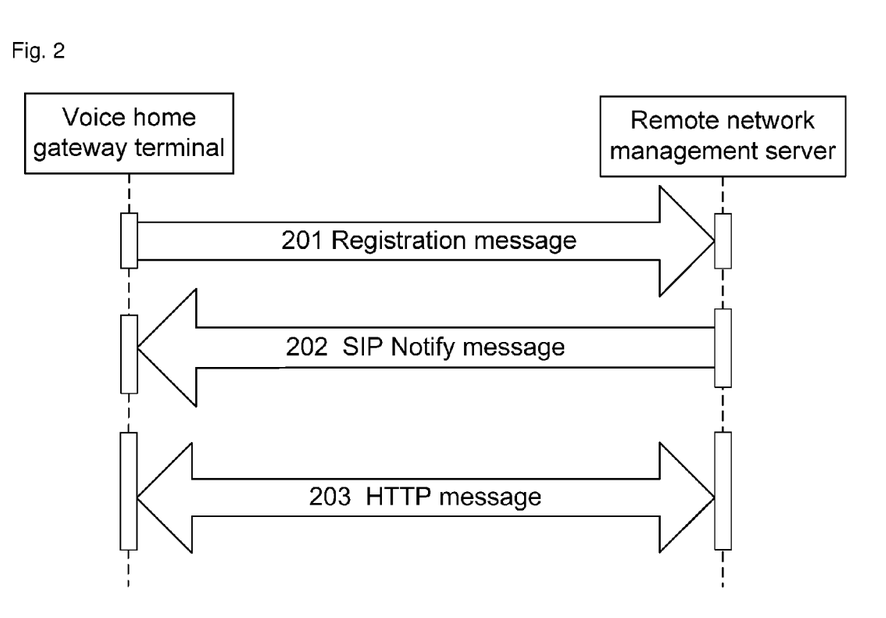
FIG. 2 illustrates a flow diagram of a main interaction of a method for performing remote network management on a voice home gateway terminal in this disclosure.

FIG. 2 illustrates a flow diagram of a main interaction of a method for performing remote network management on a voice home gateway terminal in this disclosure. As shown in FIG. 2, the main interaction flow of the network management method comprises that:

Step 201: transmitting a registration message from a voice home gateway terminal to a remote network management server, wherein the registration message may be encapsulated in HTTP. The registration message is mainly for notifying the remote network management server that the voice home gateway terminal is ready to receive messages from the remote network management server at any time.

The registration message of the voice home gateway terminal may be implemented through a regular transmitting mechanism.

Step 202: transmitting voice signaling form the remote network management server to the voice home gateway terminal after receiving the registration message from the voice home gateway terminal.

After receiving the registration message, the remote network management server may immediately transmit the voice signaling to the voice home gateway terminal; or regularly transmit the voice signaling to the voice home gateway terminal 12; or, after receiving multiple registration messages, the remote network management server may transmit the voice signaling to the voice home gateway terminal. The voice signaling may be encapsulated in an SIP Notify message format.

After receiving the voice signaling from the remote network management server, the voice home gateway terminal determines whether the voice signaling contains a non-voice triggering identifier. For example, whether the message header contains information with a content of "Event: resync". If the non-voice triggering identifier is not contained, it means the management of the voice service is needed, and the voice home gateway terminal would process the voice service according to the voice signaling; if the non-voice triggering identifier is contained, it means that the management of the non-voice service is needed, and the flow proceeds to execute step 203.

Step 203: transmitting, by the voice home gateway terminal, a non-voice request message to the remote network management server, wherein the non-voice request message contains the basic information of the voice home gateway terminal. After receiving the non-voice request message, the remote network management server sends a non-voice response message to the voice home gateway terminal, the non-voice response message containing non-voice configuration information. After receiving the non-voice response message, the voice home gateway terminal processes the non-voice service according to the non-voice configuration information in the non-voice response message.

An HTTP message may be used to interact between the voice home gateway terminal and the remote network management server. Because the HTTP proposes a concept of distinguishing client and server, in the embodiments of this disclosure, the voice home gateway terminal plays a role of an HTTPS client, while the remote network management server plays a role of an HTTPS server; wherein content interacted through HTTP messages is mainly processing of non-voice services.

Figure 3:
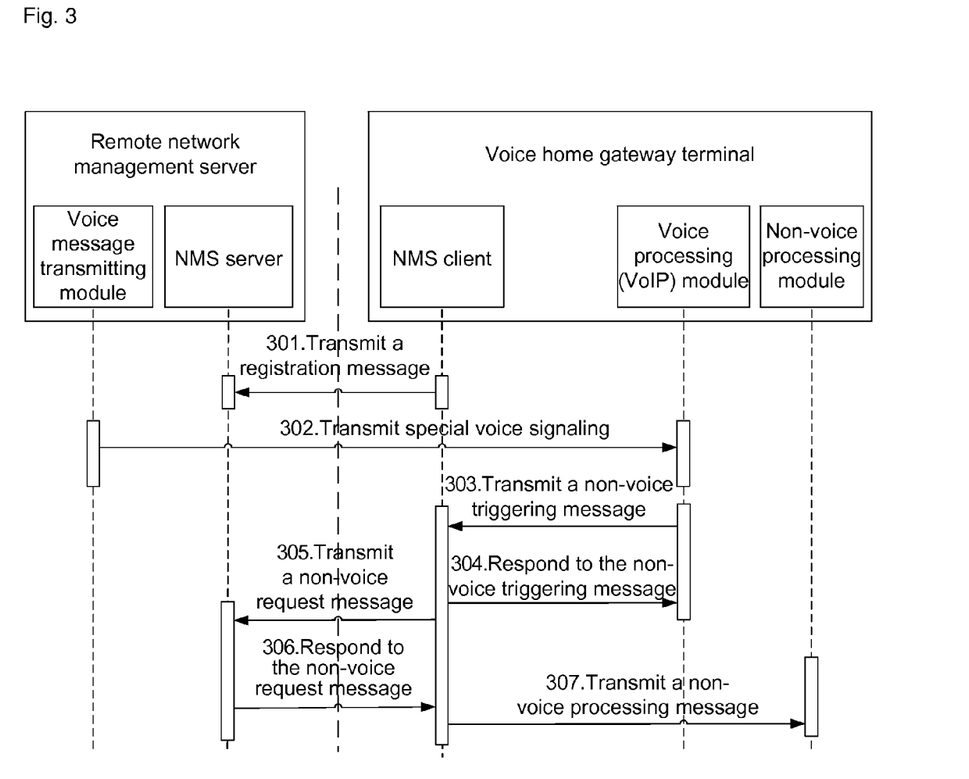
FIG. 3 illustrates a diagram of the detailed interaction sequence of the method for performing remote network management on a voice home gateway terminal in this disclosure.

FIG. 3 illustrates a diagram of the detailed interaction sequence of the method for performing remote network management on a voice home gateway terminal in this disclosure. As shown in FIG. 3, the specific process of performing remote management on a non-voice service between the remote network management server and the voice home gateway terminal utilizing voice signaling and HTTP message comprises:

Step 301: transmitting a registration message.

The NMS client in the voice home gateway terminal voluntarily transmits a registration message to the NMS server in the remote network management server, the registration message containing basic information of the voice home gateway terminal, such as IP and version information. The registration message may be encapsulated in HTTP.

Step 302: transmitting a special voice signal that contains a non-voice triggering identifier when the management of a non-voice service is needed for the voice home gateway terminal.

After receiving the registration message from the voice home gateway terminal, the NMS server notifies the voice message transmitting module that it has received the registration message of the voice home gateway terminal. The voice message transmitting module transmits voice signaling to the voice processing module in the voice home gateway terminal, wherein the voice signaling may be encapsulated in SIP Notify message format and contains information with a content of Event: resync in the message head, namely, a non-voice triggering identifier, which means that the management of the non-voice service is needed.

Step 303: after receiving the voice signaling, the voice processing module determines whether the voice signaling contains a non-voice triggering identifier; in case of containing, it is determined that the management of the non-voice service is needed, and then the voice processing module transmits a non-voice triggering message to the NMS client in the voice home network management terminal, so as to trigger the NMS client to transmit the non-voice request message to the NMS server.

Step 304: after receiving the non-voice triggering message, the NMS client sends a non-voice triggering response message to the voice processing module in response to the non-voice triggering message.

Step 305: transmitting a non-voice request message.

The NMS client transmits a non-voice request message to the NMS server, such as a POST request message, which message may further contain basic information of the voice home gateway terminal.

Step 306: sending, by the NMS server, a non-voice response message to the NMS client after receiving the non-voice request message.

The non-voice request message may further contain basic information of the voice home gateway terminal. The NMS server may send a corresponding non-voice response message to voice home gateway terminal according to the basic information contained in the non-voice request message, or send the pre-encapsulated non-voice response message to the voice home gateway terminal.

During remote management of the voice home gateway terminal, because the remote network management server plays a role of manager, the management of the non-voice service to be performed for the voice home gateway terminal is always determined by the remote network management server. Therefore, after determining the management of the non-voice service to be performed for the voice home gateway terminal, the remote network management server may perform encapsulation in advance according to the support condition of the message format by the voice home gateway terminal. In this way, after the remote network management server receives the non-voice request message, the NMS server can directly send the pre-encapsulated non-voice response message to the voice home gateway terminal, thereby improving the processing efficiency.

Step 307: transmitting a non-voice processing message.

After receiving the non-voice response message, the NMS client transmits a non-voice processing message to the non-voice processing module according to the non-voice configuration information contained in the non-voice response message, to instruct the non-voice processing module to process the non-voice service, wherein the non-voice processing message contains non-voice configuration information. The non-voice processing module processes the non-voice service according to the received non-voice processing message. The non-voice configuration information may be parameters such as file name, upgrade server name and protocol way.

Hereinafter, the method for performing remote network management on a voice home gateway terminal will be described in detail with reference to two embodiments.

Embodiment 1 is a specific implementation flow of configuring a non-voice service function.

In this embodiment, at steps 401-402, the remote network management server prepares a message to be transmitted to the voice home gateway terminal.

At step 401: because it is currently needed to configure a non-voice service function, the remote network management server prepares voice signaling containing a non-voice triggering identifier that is to be transmitted, and encapsulates the voice signaling in the format meeting the specification of the voice home gateway terminal, that is, encapsulating the voice signaling in SIP Notify message format. The voice signaling here has a special message header with content of "Event: resync" information, so to be distinguishable from a common voice signaling. The message header serves as an identifier through which the remote network management server and the voice home gateway terminal trigger the non-voice service management.

The content of the message body of the voice signaling is shown as follows:

NOTIFY sip: 69600@10.40.41.36:5060 SIP/2.0//a message format type, the SIP version No. 2.0

Via: SIP/2.0/UDP 10.40.41.36:5060; branch=z9hG4bK28934a78291f2991//a message transmission type, a routing address, and a port number To: 69600<sip: 69600@10.40.41.36; user=phone>//registered destination address From: <sip:69601@10.40.41.36;user=phone>; tag=6a073cca507b5e6a-65ab43b5//a registered head address; the registered head address is the same as the destination address in case of first registration Call-ID: 720910328-2276810532@10.40.41.36//a Call-ID of the client CSeq: 14872 NOTIFY//a voice home gateway terminal registered with same Call-ID must have an incremental Cseq number; after the remote network management server receives a non-voice request message from the voice home gateway terminal each time, the CSeq is incremented by 1; at this point, after the remote network management server receives a non-voice request message from the voice home gateway terminal, the CSeq incremented by 1 amounts to 14872

Max-Forwards: 70//a defing an allowable maximum hop for the non-voice request message transmitted by the voice home gateway terminal before arrival of the destination address Event: resync//a specific event field, wherein the voice home gateway terminal processes the configuration of the non-voice service after analyzing the field Subscription-State: active; expires=1000//a valid time length of subscription Contact: sip: b@atlanta.example.com//an address for receiving the request Content-Length: 0//a length of the message Step 402: preparing a non-voice response message that is to be transmitted by the remote network management server, encapsulating the non-voice response message in a format meeting the specification of the voice home gateway terminal.

The specific format of the non-voice response message is as follows:

<?xml version='1.0' standalone='no'?>//an XML formatted document declaration, including information such as version; herein, version 1.0 is adopted <response>//the message by which the remote network management server responds the voice home gateway terminal <header>

<version>2.0</version>

</header>//above three fields indicate some basic information of the remote network management server or the voice home gateway terminal, such as a server version number of the remote network management server and a serial number of the voice home gateway terminal; the voice home gateway terminal uses these three fields to analyze a message, for example, a "HEAD" field of an HTTP message <body>

<status>success</status>//the remote network management server receives the non-voice request message from the voice home gateway terminal successfully <reboot>yes</reboot>//the voice home gateway terminal needs to execute reboot operation </body>//above four fields, as message body content description, are used by the remote network management server to tell the voice home gateway terminal about the action desired to be performed by the voice home gateway terminal. Herein, it indicates that the voice home gateway terminal is expected to execute the reboot operation.

</response> wherein the "reboot" field is the function which needs the voice home gateway terminal to complete in response to the remote network management server in the non-voice service.

Steps 403-406 show the interaction process between the voice home gateway terminal and the remote network management server.

Step 403: establishing, by the voice home gateway terminal, a connection with the remote network management server through registration, i.e., connecting with the remote network management server through a registration message of HTTP message.

Step 404: after connection, transmitting the voice signaling encapsulated at step 401, i.e., the SIP Notify message, from the remote network management server to the voice home gateway terminal that has been connected therewith; wherein after receiving the voice signaling, the voice home gateway terminal determines that the remote network management server needs to manage the non-voice service of the voice home gateway terminal according to the information with a content of "Event: resync" contained in the message header of the voice signaling, and transmits the non-voice request message to the remote network management server, wherein the non-voice request message, which is an HTTP message, may be transmitted to the remote network management server by means of POST.

Step 405: transmitting, by the remote network management server, the non-voice response message encapsulated in step 402 to the voice home gateway terminal after receiving the non-voice request message from the voice home gateway terminal.

Step 406: after receiving the non-voice response message from the remote network management server, calling an XML base and generating a data structure containing parameters in the message such as name and value, by the voice home io gateway terminal. In this embodiment, for parameters in the data structure, if the parameter name is status, the value is success; if the parameter name is reboot, the value is yes. The voice home gateway terminal executes the reboot operation according to the parameters in the data structure of the XML base. Above specific operations are implemented by the non-voice processing module in the voice home is gateway terminal. In this embodiment, the non-voice processing module is specifically a non-voice service function configuration module.

Embodiment 2 illustrates a specific implementation flow for upgrading configuration and version file.

The remote network management server may further perform upgrade operation on configuration and version file of the voice home gateway terminal.

In this embodiment, at steps 501-502, the remote network management server prepares a message to be transmitted to the voice home gateway terminal.

At step 501, because it is currently needed to upgrade the configuration and version file of a non-voice service, the remote network management server prepares voice signaling containing a non-voice triggering identifier that is to be transmitted, and the voice signaling is encapsulated in a format meeting the specification of the voice home gateway terminal, that is, encapsulating the voice signaling in an SIP Notify message format. The voice signaling here adopts a special message header with content of "Event: resync" information, so as to be distinguishable from a common voice signaling. The message header serves as an identifier through which the remote network management server and the voice home gateway terminal trigger the non-voice service management.

At step 502, the remote network management server prepares a non-voice response message to be transmitted, and the non-voice response message is encapsulated in a format meeting the specification of the voice home gateway terminal.

The specific format of the non-voice response message is as follows:
 <?xml version='1.0' standalone='no'?>//an XML formatted document declaration, including information such as version. Herein, version 1.0 is adopted
 <response>//a message by which the remote network management server responds the voice home gateway terminal
 <header>
 <version>2.0</version>
 </head>//above three fields indicate some basic information of the remote network management server or the voice home gateway terminal, such as a server version number of the remote network management server and a serial number of the voice home gateway terminal; the three fields are used by the voice home gateway terminal to analyze the message, such as: a "HEAD" field of an HTTP message
 <body>
 <status>success</status>//the remote network management server receives the non-voice request message from the voice home gateway terminal successfully
 <filetype>version</filetype>//indicating a parameter type
 <filename>h260ver</filename>//indicating a parameter name
 <downloadmethod>http</downloadmethod>//indicating a protocol manner used for downloading a file
 </body>//above six fields, as message body content description, are employed by the remote network management server to tell the voice home gateway terminal about the actions desired to be performed by the voice home gateway terminal. Herein, it indicates that the voice home gateway terminal is expected to execute upgrade operation on configuration and version file
 </response>
 wherein "filetype", "filename" and "downloadmethod" fields are the functions which needs the voice home gateway terminal to complete in response to the remote network management server in the non-voice service.

Steps 503-506 illustrate the interaction process between the voice home gateway terminal and the remote network management server.

At step 503, the voice home gateway terminal establishes a connection with the remote network management server through registration, that is, connecting with the remote network management server through the registration message of an HTTP message.

At step 504, after connection is established, the remote network management server transmits the voice signaling encapsulated in step 501, namely, the SIP Notify message, to the voice home gateway terminal with which connection has been established; after receiving the voice signaling, the voice home gateway terminal determines that the remote network management server needs to manage the non-voice service of the voice home gateway terminal according to the information with a content of "Event: resync" contained in the message header of the voice signaling, and transmits the non-voice request message to the remote network management server, wherein the non-voice request message is an HTTP message which can be transmitted to the remote network management server by means of POST.

At step 505, after receiving the non-voice request message from the voice home gateway terminal, the remote network management server transmits the non-voice response message encapsulated in step 502 to the voice home gateway terminal.

At step 506, after receiving the non-voice response message from the remote network management server, the voice home gateway terminal calls the XML database and generates a data structure containing parameters of the message such as a name and a corresponding value. In this embodiment, for parameters in the data structure, if the parameter name is "status", the corresponding value is "success"; if the parameter name is "filetype", the corresponding value is "version"; if the parameter name is "filename", the corresponding value is "h260ver", and if the parameter name is "downloadmethod", the corresponding value is "http"; according to the parameters in the data structure of the XML base, the voice home gateway terminal downloads configuration and a version file for upgrading by a specified protocol manner, and then performs the upgrade operation on the configuration and the version file. Above specific operations are implemented by the non-voice processing module in the voice home gateway terminal. In this embodiment, the non-voice processing module is specifically a non-voice service upgrade module.

It should be noted that in this embodiment, no specific file path is described because the remote network management server and the voice home gateway terminal have come into agreement with the download path (namely, the file server) in advance; if no file server is agreed upon, the field of the download path may be added in the non-voice response message.

The HTTP message may be implemented according to the HTTP or the HTTPS.

Above descriptions are only preferred embodiments of this disclosure and are not intended to limit the protection scope of this disclosure.

The invention claimed is:

1. A method for performing remote network management on a voice home gateway terminal, comprising:
   determining, by a remote network management server, whether to manage non-voice services of the voice home gateway terminal;
   if it is determined by the remote network management server to manage the non-voice services of the voice home gateway terminal, transmitting, via a voice signaling control protocol in a voice signaling channel, by the remote network management server to the voice home gateway terminal voice signaling including a non-voice triggering identifier to notify the voice home gateway terminal to request, via a non-voice signaling control protocol in a non-voice signaling channel, non-voice configuration information from the remote network management server based on the voice signaling including the non-voice triggering identifier and to process, via a non-voice signaling control protocol in a non-voice signaling channel, a non-voice service according to the received non-voice configuration information; and
   if it is determined by the remote network management server not to manage the non-voice services of the voice home gateway terminal, transmitting, via a voice signaling control protocol in a voice signaling channel, by the remote network management server to the voice home gateway terminal voice signaling without non-voice triggering identifier to notify the voice home gateway terminal to process voice service according to the voice signaling via a voice signaling control protocol in a voice signaling channel,
   wherein the non-voice configuration information comprises at least one of file name, upgrade server name and protocol way; and
   the method further comprises: after receiving the voice signaling from the remote network management server, determining by the voice home gateway terminal whether the voice signaling contains a non-voice triggering identifier, processing by the voice home gateway terminal a voice service according to the voice signaling when no non-voice triggering identifier is contained, and requesting by the voice home gateway terminal non-voice configuration information from the remote network management server when a non-voice triggering identifier is contained and processing by the voice home gateway terminal a non-voice service according to the received non-voice configuration information,
   wherein the method further comprises transmitting, by the voice home gateway terminal, a registration message to the remote network management server to establish a connection with the remote network management server before the remote network management server transmits the voice signaling to the voice home gateway terminal.

2. The method according to claim 1, wherein the voice home gateway terminal comprises a voice processing module, a Network Management System (NMS) client and a non-voice processing module, wherein
   the voice processing module is configured to determine whether a non-voice triggering identifier is contained in the received voice signaling and further to process the voice service according to the voice signaling;
   when non-voice triggering identifier is contained in the voice signaling, the step of requesting non-voice configuration information from the remote network management server comprises: transmitting, by the voice processing module, a non-voice triggering message to the NMS client; and transmitting, by the NMS client, a non-voice request message to the remote network management server;
   the non-voice processing module is configured to process the non-voice service according to the non-voice configuration information.

3. The method according to claim 1, wherein the remote network management server at least comprises: an NMS server,
   the step of requesting non-voice configuration information from the remote network management server comprises: transmitting, by the voice home gateway terminal, a non-voice request message to the NMS server; and sending, by the NMS server, a non-voice response message to the voice home gateway terminal, the non-voice response message containing the non-voice configuration information.

4. The method according to claim 3, wherein the step of sending a non-voice response message to the voice home gateway terminal comprises:
   sending a corresponding non-voice response message to the voice home gateway terminal according to basic information contained in the non-voice request message; or,
   sending a pre-encapsulated non-voice response message to the voice home gateway terminal, and the non-voice response message meeting a message format supported by the voice home gateway terminal.

5. A system for performing remote network management on a voice home gateway terminal, comprising a remote network management server to perform the remote network management on the voice home gateway terminal, wherein the remote network management server is configured to
   determine whether to manage non-voice services of the voice home gateway terminal;
   if it is determined to manage the non-voice services of the voice home gateway terminal, transmit, via a voice signaling control protocol in a voice signaling channel, the voice home gateway terminal voice signaling including a non-voice triggering identifier to notify the voice home gateway terminal to request, via a non-voice signaling control protocol in a non-voice signaling channel, non-voice configuration information from the remote network management server based on the voice signaling including a non-voice triggering identifier and to process, via a non-voice signaling control protocol in a non-voice signaling channel, a non-voice service according to the received non-voice configuration information; and
   if it is determined not to manage the non-voice services of the voice home gateway terminal, transmit, via a voice signaling control protocol in a voice signaling channel, to the voice home gateway terminal voice signaling without non-voice triggering identifier to notify the voice home gateway terminal to process voice service according to the voice signaling via a voice signaling control protocol in a voice signaling channel, wherein the non-voice configuration information comprises at least one of file name, upgrade server name and protocol way; and the system further comprises the voice home gateway terminal, wherein the voice home gateway terminal is configured to receive the voice signaling from the remote network management server, determine whether the voice signaling contains a non-voice triggering identifier, process a voice service according to the voice signaling when no non-voice triggering identifier is contained, request non-voice configuration information from the remote network management server when a non-voice triggering identifier is contained, and process a non-voice service according to the received non-voice configuration information, wherein the voice home gateway terminal is further configured to transmit a registration message to the remote network management server.

6. The system according to claim 5, wherein the remote network management server comprises:

a voice message transmitting module configured to transmit the voice signaling to the voice home gateway terminal; and an NMS server configured to receive a non-voice request message from the voice home gateway terminal, and send a non-voice response message to the voice home gateway terminal.

7. The system according to claim 6, wherein the voice home gateway terminal comprises:

a voice processing module, configured to receive the voice signaling from the remote network management server, determine whether the voice signaling contains a non-voice triggering identifier, process a voice service according to the voice signaling when no non-voice triggering identifier is contained, and transmit a non-voice triggering message to the NMS client when a non-voice triggering identifier is contained;

an NMS client, configured to transmit a non-voice request message to the remote network management server according to the non-voice triggering message, and instruct a non-voice processing module to process the non-voice service according to the non-voice configuration information contained in the non-voice response message that is transmitted from the remote network management server;

the non-voice processing module, configured to process the non-voice service according to the instruction from the NMS client.

8. The system according to claim 7, wherein the NMS client is further configured to send a non-voice triggering response message to the voice processing module.

* * * * *